Aug. 16, 1932.   W. E. MASTERSON   1,872,313
MAGNETIC MOTOR
Filed April 5, 1930   2 Sheets-Sheet 2

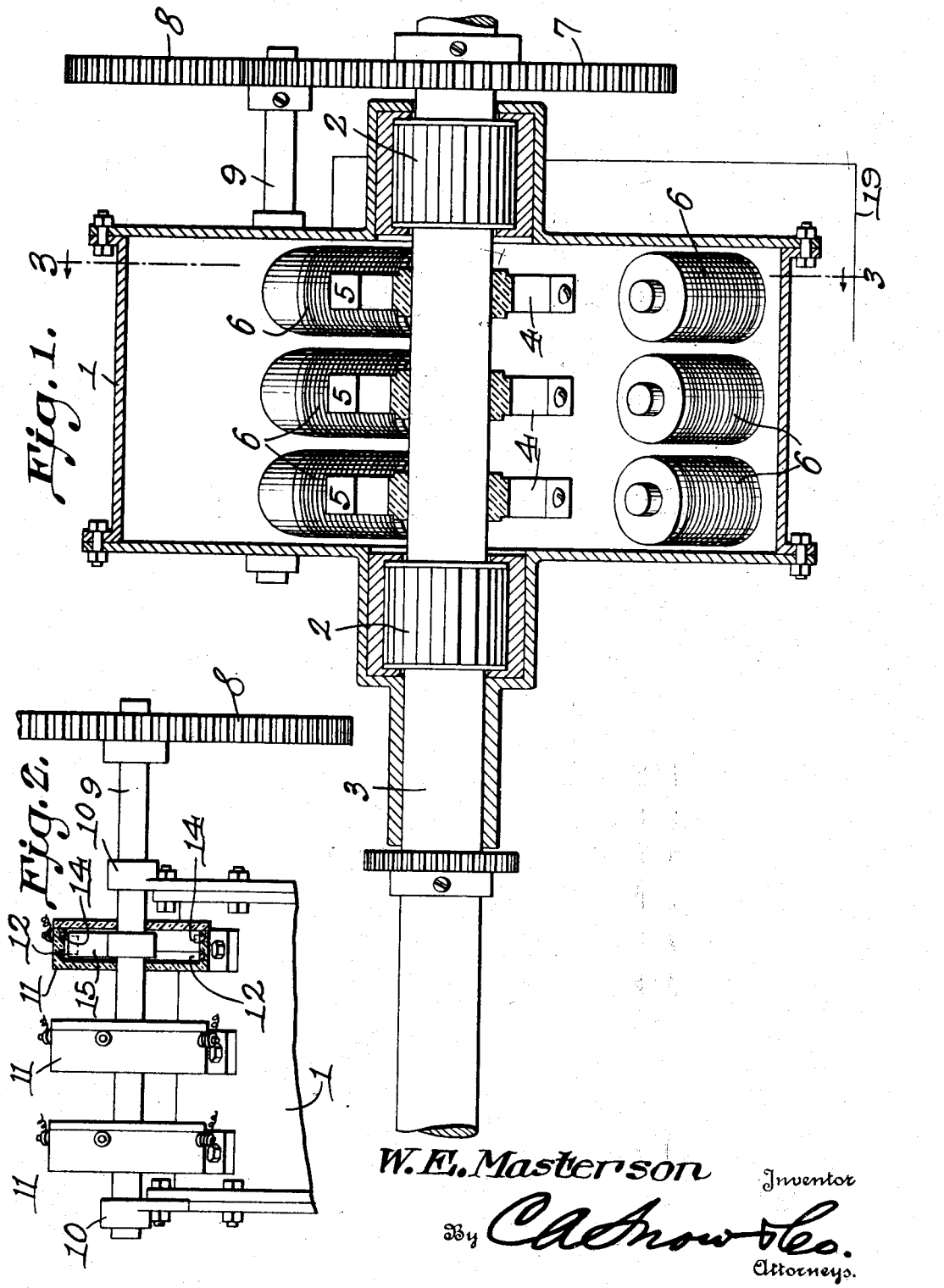

W. E. Masterson, Inventor
By C. A. Snow & Co.
Attorneys.

Patented Aug. 16, 1932

1,872,313

UNITED STATES PATENT OFFICE

WILLIAM E. MASTERSON, OF BORGER, TEXAS, ASSIGNOR OF ONE-THIRD TO F. L. COWAN AND ONE-THIRD TO J. F. ROBERTS, BOTH OF BORGER, TEXAS

MAGNETIC MOTOR

Application filed April 5, 1930. Serial No. 442,020.

This invention has for its object, the provision of a simple but effective magnetic or impulse motor.

In the accompanying drawings:—

Figure 1 shows in section, a device constructed in accordance with the invention;

Figure 2 is a sectional view showing the distributors;

Figure 3:
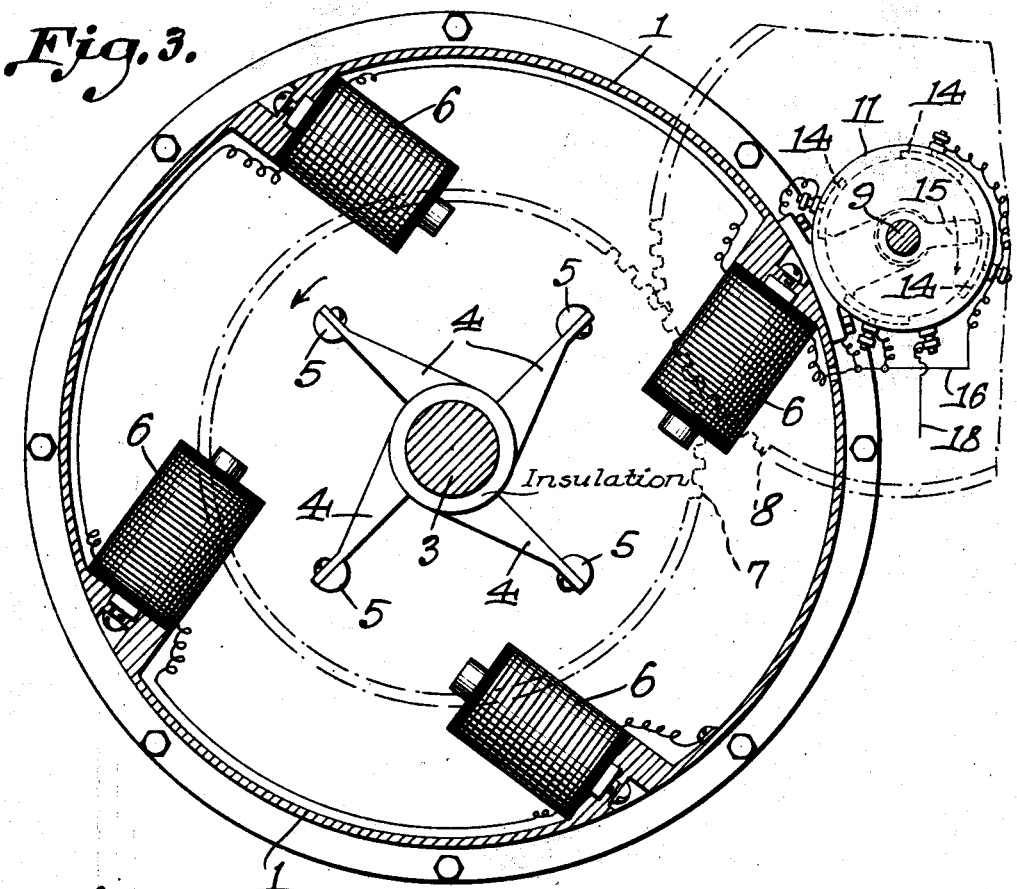
Figure 3 is a transverse section through the stator and attendant parts.

The stator includes a frame or casing 1 provided with anti-friction bearings 2 in which is journaled a main shaft 3 provided with any desired number of radial arms 4 carrying armatures 5. Preferably there are three sets of arms 4, there being four arms in each set. The arms 4 and the armatures 5 move in operative relation to electro-magnets 6 on the frame or casing 1, there being three rows of electro-magnets, if desired, and there being four electro-magnets in each row.

On one end of the shaft 3, or on any desired part of the shaft, there is a gear wheel 7 meshing with a gear wheel 8 on a shaft 9 supported for rotation on the frame or casing 1.

Housings 11 are mounted on the casing 1. In each housing is located a conducting ring 12, and a plurality of segments 14, the ring and the segments being engaged by a brush 15 on the shaft 9. A conductor 16 is joined to each of the segments 14, and is connected to the winding of the electro-magnets 6. The last electro-magnet in each row is grounded as shown at 17. The conducting ring 12 is connected at 18 to a conductor 19 leading to a source of electrical energy (not shown).

Figure 4:
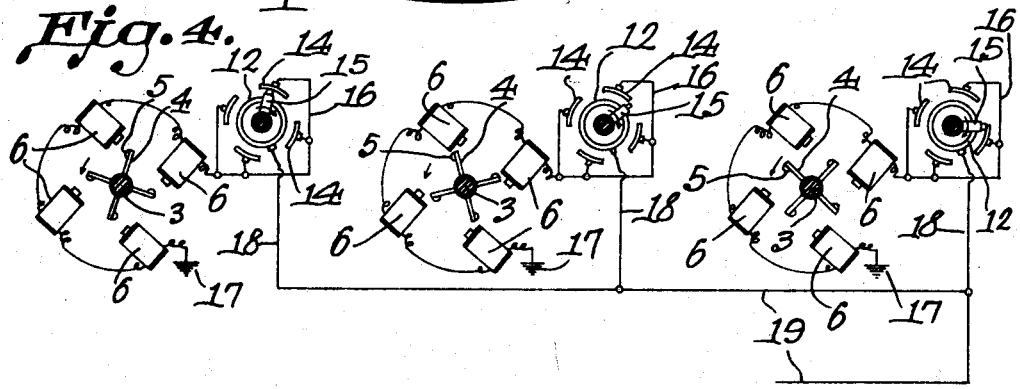
Figure 4 is a circuit diagram.

In practical operation, current flows through the conductor 19 to the rings 12, and the brushes 15 carry the current across into the segments 14, the current passing thence into the windings of the electro-magnets 6. When the magnets 6 are energized, they attract the armatures 5 and impart rotation to the shaft 3, it being possible to take power off the shaft 3 for any desired purpose. The circuit is completed from the electro-magnets 6 to the ground at 17. The timers shown in Figure 4 are so arranged as to give the shaft 3 a large number of impulses at each revolution.

Having thus described the invention, what is claimed is:

1. A motor of the class described, comprising a frame, a main shaft journaled on the frame, armatures carried by the main shaft, electro-magnets on the frame in operative relation to the armatures and having their windings connected in series, a second shaft journaled on the frame, gearing connecting the shafts, a conducting ring and a plurality of segments supported about the second shaft, a brush on the second shaft, the brush engaging the ring and being engageable with the segments, a conductor joined to each of the segments and connected to one end of the series-winding of the electro-magnets, and a lead connected to the conducting ring.

2. A motor of the class described, comprising a frame, a housing on the frame, a main shaft journaled on the frame, arms projecting from the main shaft, armatures on the outer ends of the arms, inwardly-extended electro-magnets on the frame and disposed out of radial relation with respect to the main shaft, the electro-magnets cooperating with the armatures and having their windings connected in series, a second shaft journaled on the frame and in the housing, a conducting ring and a plurality of segments carried by the housing and disposed about the second shaft, a brush on the second shaft, the brush engaging the ring and being engageable with the segments, a conductor joined to each of the segments and connected to one end of the series-winding of the electro-magnets, and a lead connected to the conducting ring.

In testimony that I claim the foregoing as my own, I have hereto affixed my signature.

WILLIAM E. MASTERSON.